(12) United States Patent
Kumar

(10) Patent No.: US 10,937,428 B2
(45) Date of Patent: Mar. 2, 2021

(54) POSE-INVARIANT VISUAL SPEECH RECOGNITION USING A SINGLE VIEW INPUT

(71) Applicant: Adobe Inc., San Jose, CA (US)

(72) Inventor: Yaman Kumar, Inderpuri (IN)

(73) Assignee: Adobe Inc., San Jose, CA (US)

( * ) Notice: Subject to any disclaimer, the term of this patent is extended or adjusted under 35 U.S.C. 154(b) by 249 days.

(21) Appl. No.: 16/298,933

(22) Filed: Mar. 11, 2019

(65) Prior Publication Data
US 2020/0294507 A1 Sep. 17, 2020

(51) Int. Cl.
*G10L 15/22* (2006.01)
*G10L 15/25* (2013.01)
*G06N 3/08* (2006.01)
*G06N 3/04* (2006.01)
*G06K 9/00* (2006.01)

(52) U.S. Cl.
CPC .......... *G10L 15/25* (2013.01); *G06K 9/00335* (2013.01); *G06N 3/0454* (2013.01); *G06N 3/088* (2013.01)

(58) Field of Classification Search
CPC ............................. G06N 3/088; G06N 3/0454
See application file for complete search history.

(56) References Cited

U.S. PATENT DOCUMENTS

| 8,073,287 | B1* | 12/2011 | Wechsler | G06K 9/746 |
| | | | | 382/278 |
| 9,684,380 | B2* | 6/2017 | Kramer | G06F 3/0425 |
| 2005/0147292 | A1* | 7/2005 | Huang | G06K 9/00228 |
| | | | | 382/159 |
| 2017/0154208 | A1* | 6/2017 | Zhang | G06K 9/00288 |

OTHER PUBLICATIONS

Anina,"OuluVS2: a multi-view audiovisual database for non-rigid mouth motion analysis", 2015 11th IEEE International Conference and Workshops on Automatic Face and Gesture Recognition (FG), May 2015, 5 pages.
Assael,"Lipnet: End-to-end Sentence-Level Lipreading", Dec. 16, 2016, 13 pages.
Chung,"Lip Reading Sentences in the Wild", Jan. 30, 2017, 12 pages.
Estellers,"Multipose Audio-Visual Speech Recognition", Jan. 2011, 5 pages.

(Continued)

*Primary Examiner* — Jakieda R Jackson
(74) *Attorney, Agent, or Firm* — FIG. 1 Patents

(57) ABSTRACT

A pose-invariant visual speech recognition system obtains a single view input of a speaker, such as a single video stream captured by a single camera. The single view input provides a particular pose of the speaker, which refers to a view angle, relative to the lens or image capture component of the camera that captured the video of the speaker, at which the speaker's face is captured. The pose of the speaker is used to select a visual speech recognition model to use to generate a text label that is the words spoken by the speaker. One or more additional view angles of the speaker are also generated from the single view input of the speaker. These one or more additional view angles, along with the single view input of the speaker, are used by the selected visual speech recognition model to generate the text label for the speaker.

20 Claims, 13 Drawing Sheets

(56) References Cited

OTHER PUBLICATIONS

Fernandez-Lopez,"Survey on automatic lip-reading in the era of deep learning", Image and Vision Computing, 2018., Jul. 2018, pp. 53-72.
Isola,"Image-to-Image Translation with Conditional Adversarial Networks", 2017 IEEE Conference on Computer Vision and Pattern Recognition (CVPR), Nov. 22, 2017, 17 pages.
Kumar,"Harnessing AI for Speech Reconstruction using Multi-view Silent Video Feed", Oct. 2018, 9 pages.
Kumar,"Lipper: Synthesizing Thy Speech using Multi-View Lip-reading", Jan. 26, 2019, 8 pages.
Lan,"View Independent Computer Lip-Reading", 2012 IEEE International Conference on Multimedia and Expo, Jul. 2012, pp. 432-437.
Lucey,"An Extended Pose-Invariant Lipreading System", Sep. 2007, 5 pages.
Lucey,"Continuous Pose-Invariant Lipreading", Sep. 2006, 4 pages.
Lucey,"Lipreading Using Profile Versus Frontal Views", in IEEE Workshop on Multimedia Signal Processing, Nov. 2006, pp. 24-28.
Petridis,"End-to-End Multi-View Lipreading", Sep. 1, 2017, 14 pages.
Simonyan,"Very deep convolutional networks for large-scale image recognition", In Journal of Computing Research Repository, Sep. 2014, 14 pages.
Souza,"Towards High-Resolution Face Pose Synthesis", 2018 International Joint Conference on Neural Networks (IJCNN)., Oct. 15, 2018, 8 pages.
Zhou,"A review of recent advances in visual speech decoding", Jul. 3, 2014, pp. 590-605.

* cited by examiner

POSE-INVARIANT VISUAL SPEECH RECOGNITION USING A SINGLE VIEW INPUT

BACKGROUND

As computer technology has advanced computers have become increasingly commonplace in our lives and have found a wide variety of different uses. One such use is visual speech recognition systems. A visual speech recognition system analyzes video of a speaker and generates a text label that is the words spoken by the speaker. Conventional visual speech recognition systems, however, have various drawbacks that result in poor visual speech recognition performance.

Some conventional visual speech recognition systems use a single view of the speaker, such as a single camera capturing the speaker. These systems rely on the speaker looking into the camera at a specific angle, such as with the speaker's face being parallel to the lens or image capture component of the camera. These systems perform poorly if the speaker moves, turns his or her head, etc. and is not looking into the camera at the specific angle, which is a common occurrence when people speak.

Other conventional visual speech recognition systems rely on having multiple cameras each capturing a view of the speaker from different viewing angles. For example, one camera may capture the speaker at a 0 degree angle (where the speaker's face is parallel to the lens or image capture component of the camera), a second camera may capture the speaker at a 90 degree angle (where the speaker's face is perpendicular to the lens or image capture component of the camera), and a third camera may capture the speaker at a 45 degree angle (where the speaker's face is at a 45 degree angle to the lens or image capture component of the camera). Conventional systems using multiple cameras each capturing a view of the speaker from a different viewing angle can have an improved visual speech recognition accuracy over conventional systems using a single view of the user. However, the need to use multiple cameras increases the system cost and complexity of a visual speech recognition system, and cannot work on embedded devices that have a single camera unless additional cameras are purchased and set up at the appropriate angles to capture the speaker.

Furthermore, conventional multiple camera systems suffer from the same problem as single camera systems, namely they rely on the speaker looking into the cameras at specific angles. Multiple camera systems perform poorly if the speaker moves, turns his or her head, etc. and is not looking into one camera at the specific angle, which is a common occurrence when people speak.

These drawbacks to conventional visual speech recognition systems can result in significant financial expense to a user as well as forcing the speaker to remain stationary while speaking, leading to user frustration with their computers and visual speech recognition systems.

SUMMARY

To mitigate the drawbacks of conventional visual speech recognition systems, a pose-invariant visual speech recognition system as implemented by a computing device is described to visually recognize speech from a speaker in video content. The pose-invariant visual speech recognition system visually recognizes speech from a single view of the speaker in video content and using a visual speech recognition model that relies on multiple view angles of the speaker to generate text labels indicating words spoken by the speaker. Thus, although the visual speech recognition model relies on multiple view angles of the speaker, the pose-invariant visual speech recognition system visually recognizes speech despite having only a single view of the speaker in the video content.

Video content including a single view of the speaker having a particular pose is obtained. The single view is classified as a current view angle of the speaker, the current view angle being one of multiple supported view angles classified based on the particular pose. One of multiple visual speech recognition models is selected based on the current view angle of the speaker and a mapping of current view angles to visual speech recognition models. Using a machine learning system, one or more additional views of the speaker are generated from the single view of the speaker, each of the one or more additional views being one of the multiple supported view angles. A text label indicating words spoken by the speaker is generated using the selected one of the multiple visual speech recognition models and based on the single view of the speaker as well as the one or more additional views of the speaker, the one of the multiple visual speech recognition models relying on multiple view angles of the speaker when generating the text label. The text label is presented as the words spoken by the speaker, such as by displaying or audibly playing back the text label.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
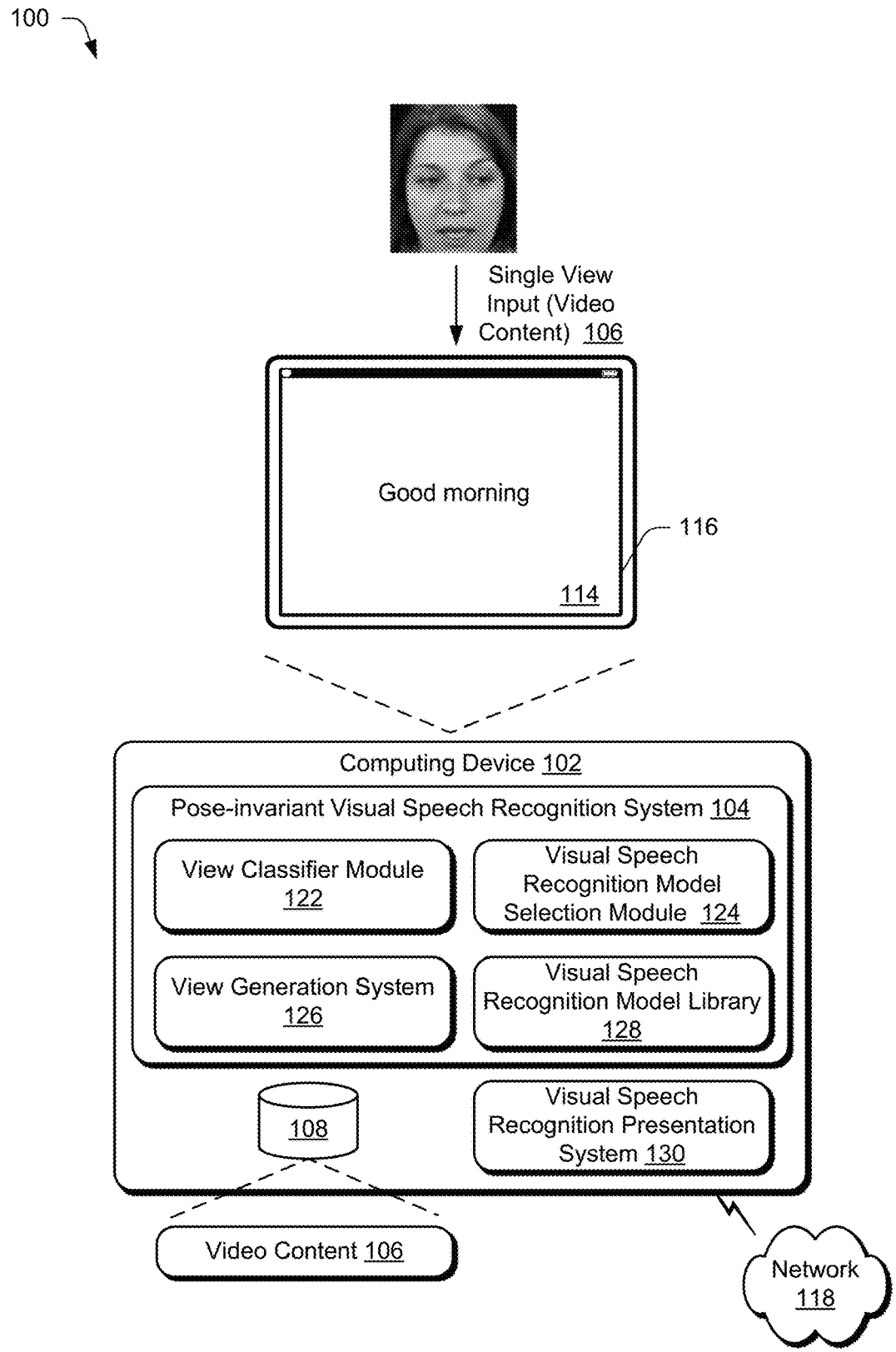
FIG. 1 is an illustration of a digital medium environment in an example implementation that is operable to employ the pose-invariant visual speech recognition using a single view input techniques described herein.

Situations occur in which visually recognizing speech of a speaker (e.g., reading a speaker's lips) is desired. Conventional visual speech recognition systems that have a single view of the speaker (e.g., a single camera capturing the speaker) rely on the speaker maintaining the same pose. These systems perform poorly if the speaker moves, turns his or her head, etc. Other conventional visual speech recognition systems rely on capturing multiple views of the speaker from multiple cameras, and these visual speech recognition systems can be more accurate than conventional visual speech recognition systems that have a single view of the speaker. However, using multiple cameras increases the system cost and complexity as multiple cameras rather than a single camera need to be set up to capture the speaker. Further, conventional multiple camera visual speech recognition systems also rely on the speaker maintaining the same pose, and perform poorly if the speaker moves, turns his or her head, etc.

To overcome these challenges, a pose-invariant visual speech recognition system uses a single view input of a speaker to generate multiple poses or views of the speaker. Generally, the pose-invariant visual speech recognition system obtains a single view input of the speaker, such as a single video stream captured by a single camera. The single view input provides a particular pose of the speaker, which refers to a view angle, relative to the lens or image capture component of the camera that captured the video of the speaker, at which the speaker's face is captured. The pose of the speaker is used to select a visual speech recognition model to use to generate a text label that is the one or more words spoken by the speaker. The pose-invariant visual speech recognition system also generates one or more additional view angles of the speaker from the single view input of the speaker. These one or more additional view angles, along with the single view input of the speaker, are used by the selected visual speech recognition model to generate the text label for the speaker. Thus, although the visual speech recognition model relies on multiple view angles of the speaker, the pose-invariant visual speech recognition system visually recognizes speech despite having only a single view of the speaker in the video content.

More specifically, the pose-invariant visual speech recognition system includes a view classifier module, a visual speech recognition model selection module, a view generation system, and a visual speech recognition model library. The view classifier module obtains a single view input of the speaker. The single view input refers to a single pose or view of the speaker being the input to the pose-invariant visual speech recognition system. The single view input is typically a video captured by a single camera at any given point in time. Additionally or alternatively, the single view input can be obtained from various other sources. For example, the single view input can be video received from another device or system, can be video received from a storage device (e.g., an optical disc or other storage device), and so forth.

The single view input provides a particular pose of the speaker. The pose of the speaker refers to a view angle, relative to the lens or image capture component of the camera that captured the video of the speaker, at which the speaker's face is captured. In one or more implementations, the pose of the speaker can range from 0 degrees (corresponding to a frontal view in which the speaker's face is parallel to the lens or image capture component) to 90 degrees (corresponding to a profile view in which the speaker's face is perpendicular to the lens or image capture component). In other implementations, the pose of the speaker can range from 0 degrees to 180 degrees (corresponding to a profile view in which the back of the speaker's head is perpendicular to the lens or image capture component).

The view classifier module analyzes the single view input to determine the current view angle of the speaker. The view classifier module determines the current view angle of the speaker to be one of a set of multiple supported view angles, also referred to as a pose vocabulary. The multiple supported view angles can be any two or more view angles ranging from 0 degrees to 180 degrees. For example, the set of multiple supported view angles can include five different view angles: 0 degrees, 30 degrees, 45 degrees, 60 degrees, and 90 degrees.

In one or more implementations, the view classifier module includes a machine learning system, such as a convolutional neural network (CNN) to determine which of the multiple supported view angles to use as the current view angle of the speaker. The machine learning system is trained on a set of training images that include at least the lip regions of speakers (and optionally include additional portions of speakers' faces) and includes images from each of the multiple supported view angles. The machine learning system is trained to generate a view label for an input image, the view label being the one of the multiple supported view angles that the current view angle of the speaker is classified as. Accordingly, in situations in which the view classifier module supports five different view angles, there are five possible view labels that can be output by the view classifier module.

The visual speech recognition model selection module receives the view label from the view classifier module and selects, from the visual speech recognition model library, one of multiple different visual speech recognition models to use to generate the text label for the speaker. The visual speech recognition model library is a collection of multiple different visual speech recognition models, and the visual speech recognition model selection module can select different visual speech recognition models for different view labels. Each of the multiple visual speech recognition models relies on multiple view angles of the speaker to generate text labels indicating words spoken by the speaker. The visual speech recognition model selection module also outputs a set of identifiers of views that the selected visual speech recognition model uses to generate the text label for the speaker. This set of view identifiers is provided to the view generation system for generation of additional views of the speaker.

The visual speech recognition model selection module includes a predefined logic (e.g., a mapping) of view labels to visual speech recognition models and view identifiers. This predefined logic can be pre-configured in the visual speech recognition model selection module, can be obtained from another program or component of a computing device implementing the pose-invariant visual speech recognition system, can be obtained from another device or service, and so forth. For each of the possible view labels that can be output by the view classifier module, the predefined logic maps the view label to a particular visual speech recognition model in a visual speech recognition model library, this mapped-to visual speech recognition model being the visual speech recognition model selected to generate the text label for the speaker. The visual speech recognition model selection module outputs an indication of the selected visual speech recognition model, notifying the visual speech recognition model library that the selected visual speech recognition model is the visual speech recognition model to use to generate the text label for the speaker. Furthermore, for each of the possible view labels that can be output by the view classifier module, the predefined logic maps the view label to identifiers of views that the selected visual speech recognition model uses to generate the text label for the speaker. The visual speech recognition model selection module outputs these view identifiers to the view generation system, informing the view generation system of one or more additional views of the speaker that the view generation system is to generate for use by the selected visual speech recognition model.

The view generation system generates one or more additional views of the speaker based on the single view input. The view generation system receives an indication of which one or more additional views to generate from the visual speech recognition model selection module. The view generation system uses the single view input to generate the indicated one or more additional views, and provides the generated views to the visual speech recognition model selected by the visual speech recognition model selection module.

In one or more implementations, the view generation system includes one or more machine learning systems, such as a conditional generative adversarial network (cGAN) to determine the one or more additional views. For example, the view generation system includes one cGAN for each possible combination of view label and additional view output. Accordingly, in the example above with five different possible view labels, the view generation system includes 20 different cGANs.

Each cGAN generates an additional view based on the single view input. Each cGAN is trained is trained on a set of training images that include at least the lip regions of speakers (and optionally include additional portions of speakers' faces). A cGAN includes two neural networks (such as convolutional neural networks (CNNs)), one referred to as the generator model and one referred to as the discriminator model. The generator model is trained to generate images that fool the discriminator model (e.g., cause the discriminator model to determine that the generated image was actually a real captured image rather than an image generated by the generator model). The discriminator model is trained to detect whether an image is a real captured image or an image generated by the generator model.

The selected visual speech recognition model receives the single view input as well as the one or more additional views generated by the view generation system, and uses the single view input as well as the one or more additional views generated by the view generation system to generate the text label for the speaker in the single view input. The selected visual speech recognition model generates the text label based on the video in the single view input and the one or more additional views generated by the view generation system—the selected visual speech recognition model relies on the lip and/or facial movements in these views and need not have access to the audio of the speaker.

The techniques discussed herein improve the operation of a computing device by performing visual speech recognition using a single view input and being tolerant of different speaker poses. The techniques discussed herein gain the advantages of having multiple views despite using a single view input. The cost of having multiple cameras capture different views of the speaker need not be incurred, and synchronization of different video feeds from different cameras fed into a visual speech recognition model need not be performed. Additionally, spatial constraints due to the need to place multiple cameras are not a concern. Furthermore, the techniques discussed herein are pose-invariant and are tolerant of different speaker poses. For example, a speaker can turn his or her head or otherwise move so that he or she is not looking into the camera at any specific angle. The techniques discussed herein accommodate such movement and allow visual speech recognition to continue to be performed despite such movement.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the pose-invariant visual speech recognition using a single view input techniques described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 13.

The computing device 102 is illustrated as including a pose-invariant visual speech recognition system 104. The pose-invariant visual speech recognition system 104 is implemented at least partially in hardware of the computing device 102 to process and transform video content 106, which is illustrated as maintained in storage 108 of the computing device 102. Such processing includes generating text labels that are the words spoken by a speaker in the video content 106 by performing visual speech recognition on the speaker in the video content 106, and rendering of the text labels (e.g., "Good morning" in the illustrated example) in a user interface 114 for output, e.g., by a display device 116. The video content 106 is the single view input to the pose-invariant visual speech recognition system 104. The storage 108 can be any of a variety of different types of storage, such as random access memory (RAM), Flash memory, solid state drive, magnetic disk drive, and so forth. Although illustrated as implemented locally at the computing device 102, functionality of the pose-invariant visual speech recognition system 104 may also be implemented in whole or part via functionality available via the network 118, such as part of a web service or "in the cloud."

An example of functionality incorporated by the pose-invariant visual speech recognition system 104 to process the video content 106 is illustrated as a view classifier module 122, a visual speech recognition model selection module 124, a view generation system 126, and visual speech recognition model library 128. The view classifier module 122 implements functionality to analyze a single view input (the video content 106) and determine a current view angle of the speaker in the single view input. The visual speech recognition model library 128 implements functionality to store multiple visual speech recognition models. The visual speech recognition model selection module 124 implements functionality to select, based on the current view angle of the speaker, one of the visual speech recognition models in the visual speech recognition model library 128. The view generation system 126 implements functionality to generate one or more additional views of the speaker based on the single view input. The selected visual speech recognition model from the visual speech recognition model library 128 implements functionality to generate a text label for the speaker in the video content 106 using the video content 106 and the one or more additional views of the speaker generated by the view generation system 126. The pose-invariant visual speech recognition system 104 can generate text labels for the video content 106 in real time (e.g., as the video content 106 is captured by a camera or other image capture device), or at some later time (e.g., the video content 106 may be analyzed after a video conference has completed).

The computing device 102 also includes a visual speech recognition presentation system 130. The visual speech recognition presentation system 130 implements functionality to present the text label generated by the pose-invariant visual speech recognition system 104. The visual speech recognition presentation system 130 can present the text label in various different manners, such as displaying the text label on the display device 116, playing back the text label audibly via one or more speakers of the computing device 102, storing the text label for later display or audible playback, and so forth.

The pose-invariant visual speech recognition system 104 can be used in any of a variety of different environments. For example, the video content 106 can be received as part of a bandwidth limited video conference, in which case the pose-invariant visual speech recognition system 104 identifies the words spoken by one or more speakers despite audio for those one or more speakers not being received at the computing device 102. By way of another example, the video content 106 can be received from a closed circuit television system that does not record audio, in which case the pose-invariant visual speech recognition system 104 identifies the words spoken by one or more speakers in the video content captured by the closed circuit television system.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Pose-Invariant Visual Speech Recognition System Architecture

Figure 2:
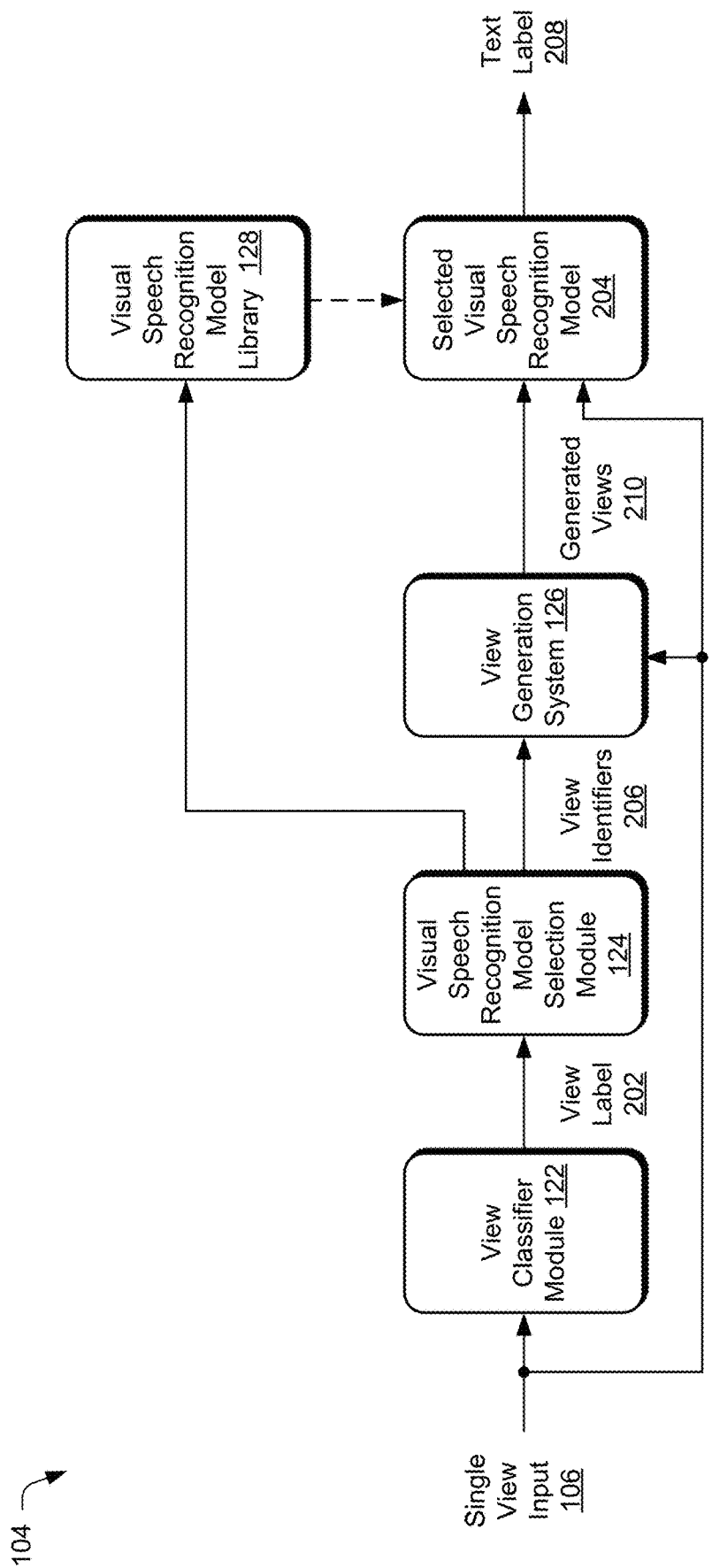
FIG. 2 is an illustration of an example architecture of a pose-invariant visual speech recognition system.

FIG. 2 is an illustration of an example architecture of a pose-invariant visual speech recognition system 104. The pose-invariant visual speech recognition system includes a view classifier module 122, a visual speech recognition model selection module 124, a view generation system 126, and a visual speech recognition model library 128. The pose-invariant visual speech recognition system 104 receives a single video input 106 and implements functionality to generate, from the single view input 106, a text label that is the words spoken by a speaker in the single view input 106.

The single view input 106 is a single pose or view of the speaker. The single view input 106 is typically a video captured by a single camera, and there need only be one camera capturing video of the speaker. In other situations, multiple cameras can be used to capture the single view input, although the video captured by only one of those multiple cameras is the single view input 106 at any given point in time. Additionally or alternatively, the single view input 106 can be obtained from various other sources. For example, the single view input 106 can be video received from another device or system, can be video received from a storage device (e.g., an optical disc or other storage device), and so forth.

The single view input 106 provides a particular pose of the speaker. The pose of the speaker refers to a view angle, relative to the lens or image capture component of the camera that captured the video of the speaker, at which the speaker's face is captured. In one or more implementations, the pose of the speaker can range from 0 degrees (corresponding to a frontal view in which the speaker's face is parallel to the lens or image capture component) to 90 degrees (corresponding to a profile view in which the speaker's face is perpendicular to the lens or image capture component) or to 180 degrees (corresponding to a profile view in which the back of the speaker's head is perpendicular to the lens or image capture component).

The view classifier module 122 receives and analyzes the single view input 106 to determine the current view angle of the speaker, and outputs a view label 202 identifying the current view angle of the speaker. The view classifier module 122 determines the current view angle of the speaker to be one of a set of multiple supported view angles, also referred to as a pose vocabulary. For example, the set of multiple supported view angles can include five different view angles: 0 degrees, 30 degrees, 45 degrees, 60 degrees, and 90 degrees. Additionally or alternatively, other numbers of view angles can be included in the set of multiple supported view angles. Furthermore, the view angles included in the set of multiple supported view angles can be any view angles, for example ranging from 0 degrees to 180 degrees.

In one or more implementations, the view classifier module 122 includes a machine learning system, which can be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

In the illustrated example, the view classifier module 122 employs a convolutional neural network (CNN), such as a VGG-16 CNN. A CNN is formed from layers of nodes (i.e., neurons) and can include various layers such as an input layer, an output layer, and one or more hidden layers such as convolutional layers, pooling layers, activation layers, fully connected layers, normalization layers, and so forth. A VGG-16 CNN is a deep CNN having 16 weight layers.

The machine learning system employed by the view classifier module 122 is trained on a set of training images that include lip regions (and optionally include additional portions of speakers' faces) of speakers and includes images from each of the multiple supported view angles. The machine learning system is trained to generate a view label for an input image, the view label being the one of the multiple supported view angles that the current view angle of the speaker is classified as. Accordingly, in situations in which the view classifier module 122 supports five different view angles, there are five possible view labels that can be output by the view classifier module 122. The machine learning system is trained, for example, by updating weights of filters in the CNN to minimize the loss between the known view labels for the training images and the view labels generated by the CNN for the training images. Various different loss functions can be used in training the CNN, such as the cross-entropy loss.

By way of example, for training the model a set of training images that include at least lip regions of speakers (and optionally include additional portions of speakers' faces) of size 224×224 pixels is used. While training, a batch size of 100 is used to train the machine learning system for 30 epochs with Adam optimization. For training, a uniform class distribution is used with an equal number of samples from each of the classes (each of the five possible view labels).

Figure 3:
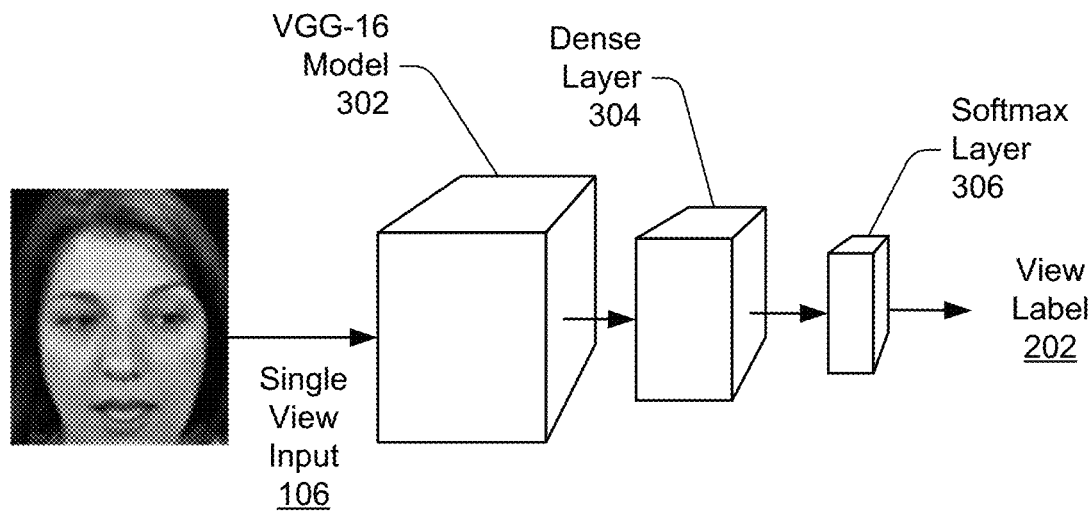
FIG. 3 is an illustration of an example architecture of a view classifier module.

FIG. 3 is an illustration of an example architecture of a view classifier module 122. The view classifier module 122 includes a VGG-16 model 302 that receives the single view input 106. The VGG-16 model 302 is followed by a dense layer 304 with 1024 units, and then by a softmax layer 306 with 5 units. The output of the softmax layer 306 is the view label 202, which is an identifier of one of the set of supported view angles (e.g., one of the five possible view labels). During training, the VGG-16 model 302 is trained to extract features from the set of training images, the dense layer 304 is trained to integrate the features extracted by the VGG-16 model 302, and the softmax layer 306 is trained to generate the view label 202 from the integrated features output of the dense layer 304.

Returning to FIG. 2, the visual speech recognition model selection module 124 receives the view label 202 from the view classifier module 122 and selects, from the visual speech recognition model library 128, one of multiple different visual speech recognition models to use to generate the text label for the speaker in the single view input 106. Each of the visual speech recognition models in the visual speech recognition model library 128 relies on multiple view angles of the speaker to generate text labels indicating words spoken by the speaker. This selected visual speech recognition model is illustrated as selected visual speech recognition model 204. The visual speech recognition model library 128 includes multiple different visual speech recognition models and different visual speech recognition models can perform differently for different view angles. For example, one visual speech recognition model may perform better if the current view angle of the speaker is 0 degrees while another visual speech recognition model may perform better if the current view angle of the speaker is 90 degrees. Accordingly, the visual speech recognition model selection module 124 can select different visual speech recognition models for different view labels.

The visual speech recognition model selection module 124 also outputs a set of view identifiers 206 that identify views of the speaker that the selected visual speech recognition model 204 uses to generate the text label 208 for the speaker. This set of view identifiers 206 is provided to the view generation system 126 for generation of one or more additional views 210 of the speaker.

The visual speech recognition model selection module 124 includes a predefined logic that is a set of rules or criteria used to identify a visual speech recognition model and a set of view identifiers based on the received view label 202. This predefined logic is, for example, a mapping of view labels to visual speech recognition models and view identifiers. This predefined logic can be pre-configured in the visual speech recognition model selection module 124, can be obtained from another program or component of a computing device implementing the pose-invariant visual speech recognition system 104, can be obtained from another device or service, and so forth. For each of the possible view labels that can be output by the view classifier module 122, the predefined logic maps the view label to a particular visual speech recognition model in the visual speech recognition model library 128. The visual speech recognition model selection module 124 outputs an indication of the mapped-to visual speech recognition model, notifying the visual speech recognition model library 128 that the mapped-to visual speech recognition model is to be used as the selected visual speech recognition model 204.

Furthermore, for each of the possible view labels that can be output by the view classifier module 122, the predefined logic of the visual speech recognition model selection module 124 maps the view label 202 to view identifiers 206. The view identifiers 206 are identifiers of views that the selected visual speech recognition model 204 uses to generate the text label 208 for the speaker. The visual speech recognition model selection module 124 outputs the set of view identifiers 206 to the view generation system 126, informing the view generation system 126 of an additional one or more views of the speaker that the view generation system 126 is to generate for use by the selected visual speech recognition model 204.

The view generation system 126 generates one or more additional views 210 of the speaker based on the single view input 106. The view generation system 126 receives the view identifiers 206 from the visual speech recognition model selection module 124, which indicate to the view generation system 126 which one or more additional views to generate for the selected visual speech recognition model 204. The view generation system 126 uses the single view input 106 to generate the one or more additional views 210, and provides the one or more generated views 210 to the selected visual speech recognition model 204.

In one or more implementations, the view generation system 126 includes one or more machine learning systems, which can be implemented using various different machine learning techniques as discussed above. In the illustrated example, the view generation system 126 includes multiple conditional generative adversarial networks (cGANs) to determine the one or more additional views 210. The view generation system 126 includes one cGAN for each possible combination of view label and additional view output. Accordingly, in the example above with five different possible view labels, there are four possible additional views that can be generated from each view label. Accordingly, there are 20 different combinations of view label and additional view output (four possible outputs for each of the five view labels), and thus the view generation system 126 includes 20 different cGANs.

A cGAN learns a mapping from input image to output image, translating the input image into a corresponding output image. A cGAN includes two neural networks (such as CNNs), one referred to as the generator model and one referred to as the discriminator model. The generator model is trained to generate images that fool the discriminator model (e.g., cause the discriminator model to determine that the generated image was actually a real captured image rather than an image generated by the generator model). The discriminator model is trained to detect whether an image is a real captured image or an image generated by the generator model.

Each cGAN in the view generation system 126 generates an additional view based on the single view input 106. The additional views generated by the view generation system 126 for the single view input 106 are provided to the selected visual speech recognition model 204.

Figure 4:
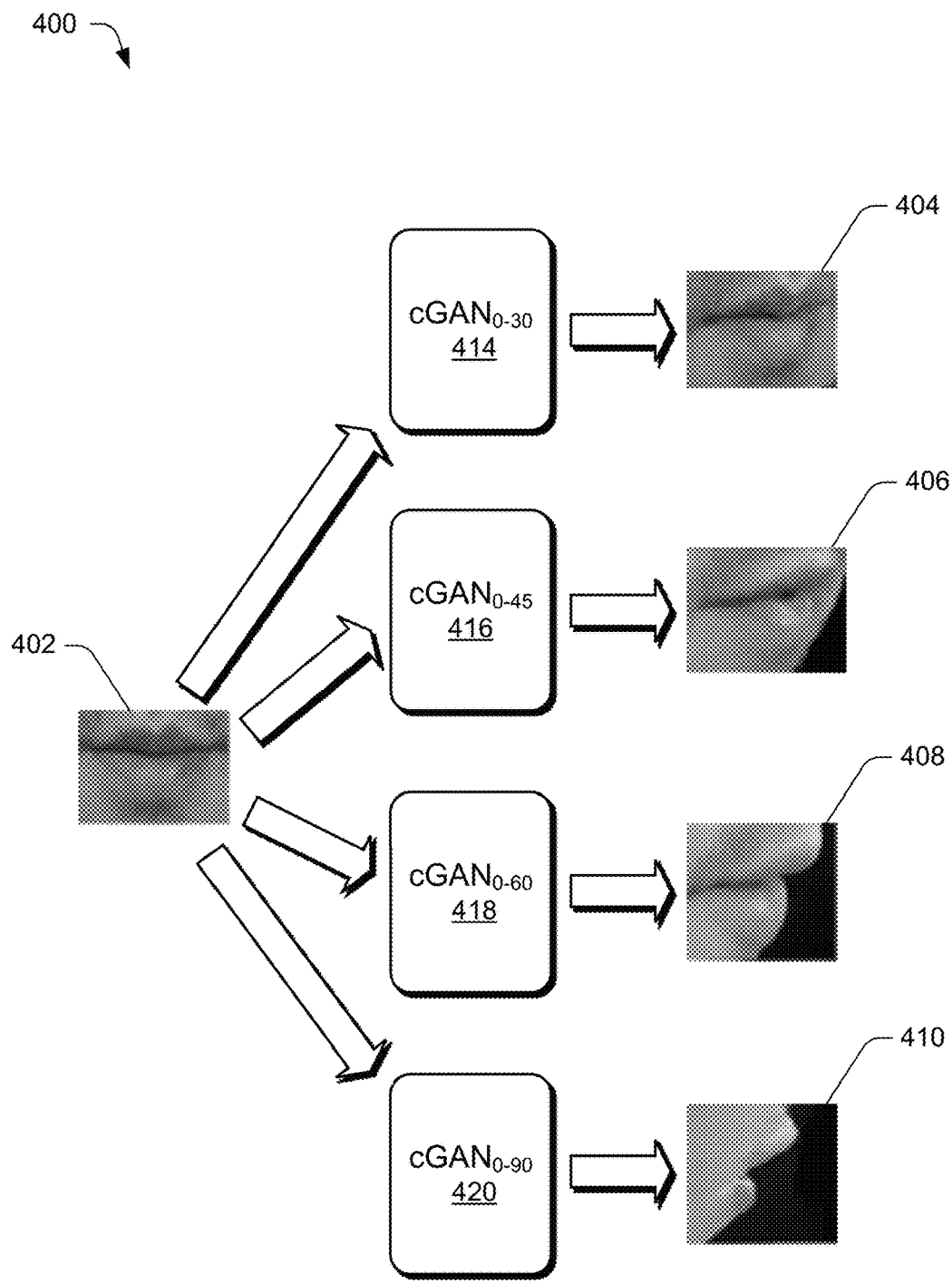
FIGS. 4, 5, 6, 7, and 8 each illustrate different example generated views based on a single view input.

FIGS. 4-8 illustrate example generated views based on a single view input. FIG. 4 illustrates an example 400 of using a single view input 402 to generate multiple additional views 404, 406, 408, and 410. In example 400, the current view angle for the speaker in the single view input 106 is 0 degrees. The visual speech recognition model selection module 124 provides view identifiers 206 indicating to the view generation system 126 to generate views for 30 degrees, 45 degrees, 60 degrees, and 90 degrees. The visual speech recognition model selection module 124 includes a $cGAN_{0-30}$ 414, a $cGAN_{0-45}$ 416, a $cGAN_{0-60}$ 418, and a $cGAN_{0-90}$ 420. The $cGAN_{0-30}$ 414 is trained to generate 30 degree views from 0 degree views, and generates additional view 404 for the 30 degree view angle. The $cGAN_{0-45}$ 416 is trained to generate 45 degree views from 0 degree views, and generates additional view 406 for the 45 degree view angle. The $cGAN_{0-60}$ 418 is trained to generate 60 degree views from 0 degree views, and generates additional view 408 for the 60 degree view angle. The $cGAN_{0-90}$ 420 is trained to generate 90 degree views from 0 degree views, and generates additional view 410 for the 90 degree view angle.

Figure 5:
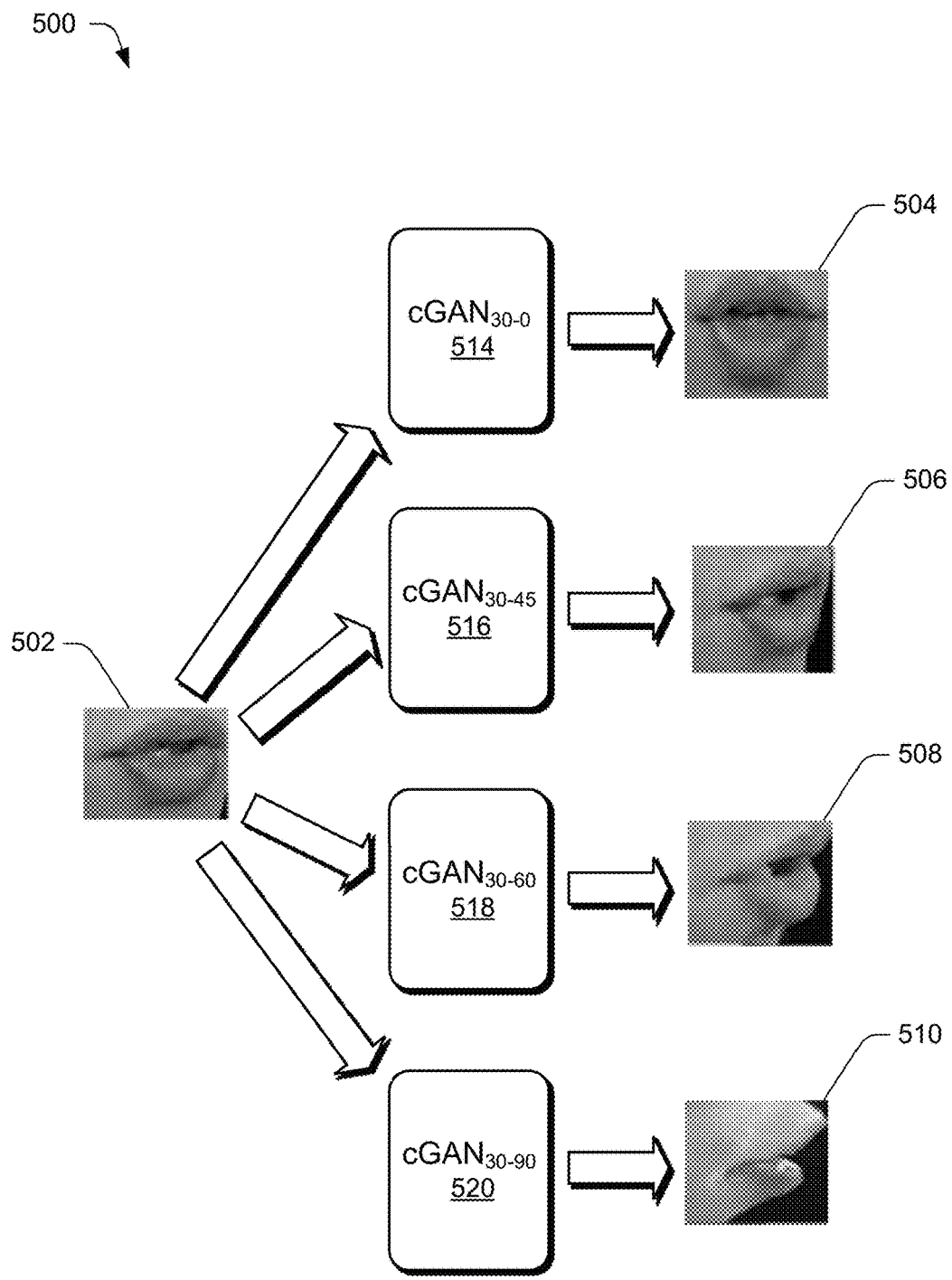

FIG. 5 illustrates an example 500 of using a single view input 502 to generate multiple additional views 504, 506, 508, and 510. In example 500, the current view angle for the speaker in the single view input 106 is 30 degrees. The visual speech recognition model selection module 124 provides view identifiers 206 indicating to the view generation system 126 to generate views for 0 degrees, 45 degrees, 60 degrees, and 90 degrees. The visual speech recognition model selection module 124 includes a $cGAN_{30-0}$ 514, a $cGAN_{30-45}$ 516, a $cGAN_{30-60}$ 518, and a $cGAN_{30-90}$ 520. The $cGAN_{30-0}$ 514 is trained to generate 0 degree views from 30 degree views, and generates additional view 504 for the 0 degree view angle. The $cGAN_{30-45}$ 516 is trained to generate 45 degree views from 30 degree views, and generates additional view 506 for the 45 degree view angle. The $cGAN_{30-60}$ 518 is trained to generate 60 degree views from 30 degree views, and generates additional view 508 for the 60 degree view angle. The $cGAN_{30-90}$ 520 is trained to generate 90 degree views from 30 degree views, and generates additional view 510 for the 90 degree view angle.

Figure 6:
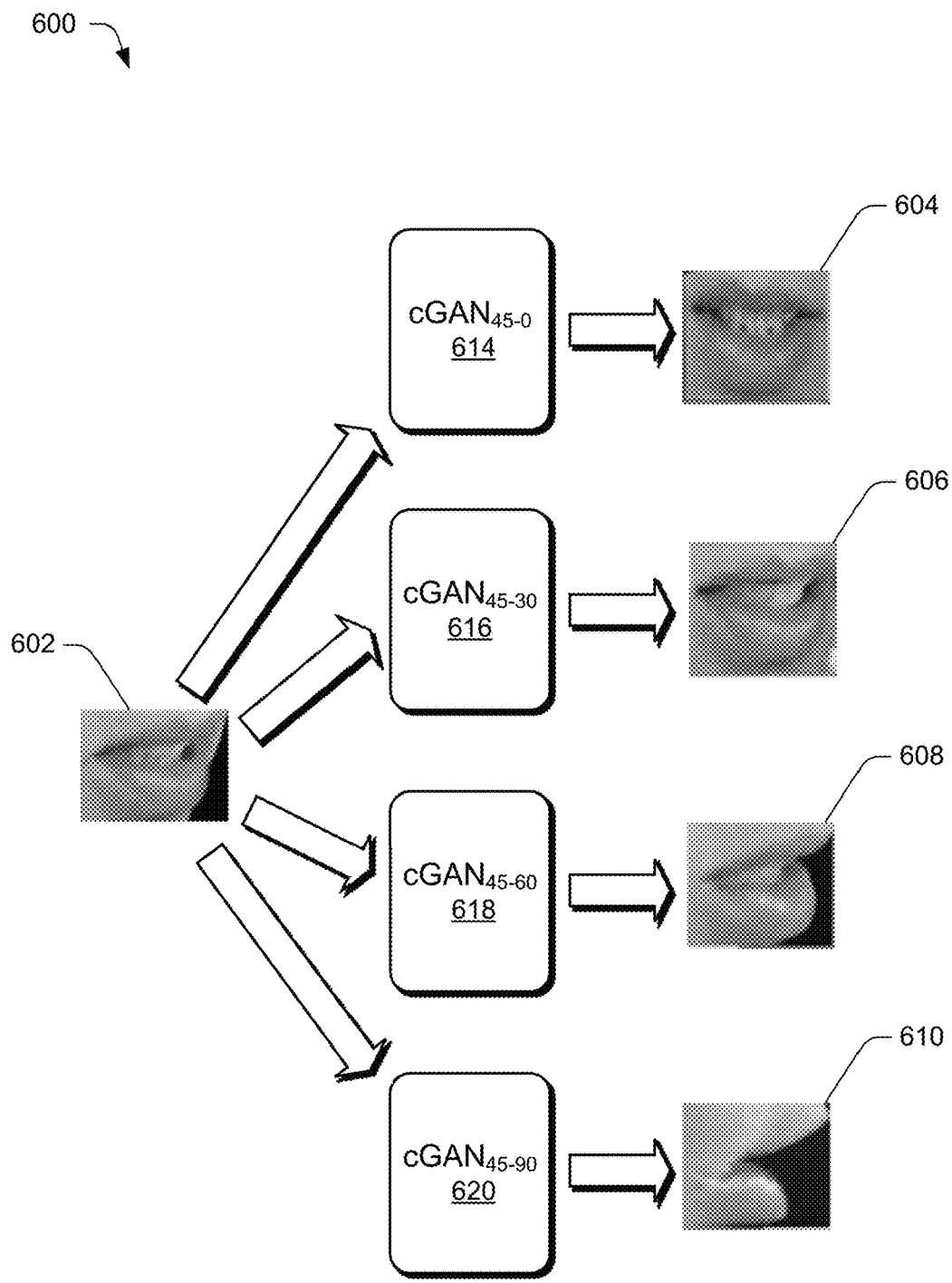

FIG. 6 illustrates an example 600 of using a single view input 602 to generate multiple additional views 604, 606, 608, and 610. In example 600, the current view angle for the speaker in the single view input 106 is 45 degrees. The visual speech recognition model selection module 124 provides view identifiers 206 indicating to the view generation system 126 to generate views for 0 degrees, 30 degrees, 60 degrees, and 90 degrees. The visual speech recognition model selection module 124 includes a $cGAN_{45-0}$ 614, a $cGAN_{45-30}$ 616, a $cGAN_{45-60}$ 618, and a $cGAN_{45-90}$ 620. The $cGAN_{45-0}$ 614 is trained to generate 0 degree views from 45 degree views, and generates additional view 604 for the 0 degree view angle. The $cGAN_{45-30}$ 616 is trained to generate 30 degree views from 45 degree views, and generates additional view 606 for the 30 degree view angle. The $cGAN_{45-60}$ 618 is trained to generate 60 degree views from 45 degree views, and generates additional view 608 for the 60 degree view angle. The $cGAN_{45-90}$ 620 is trained to generate 90 degree views from 45 degree views, and generates additional view 610 for the 90 degree view angle.

Figure 7:
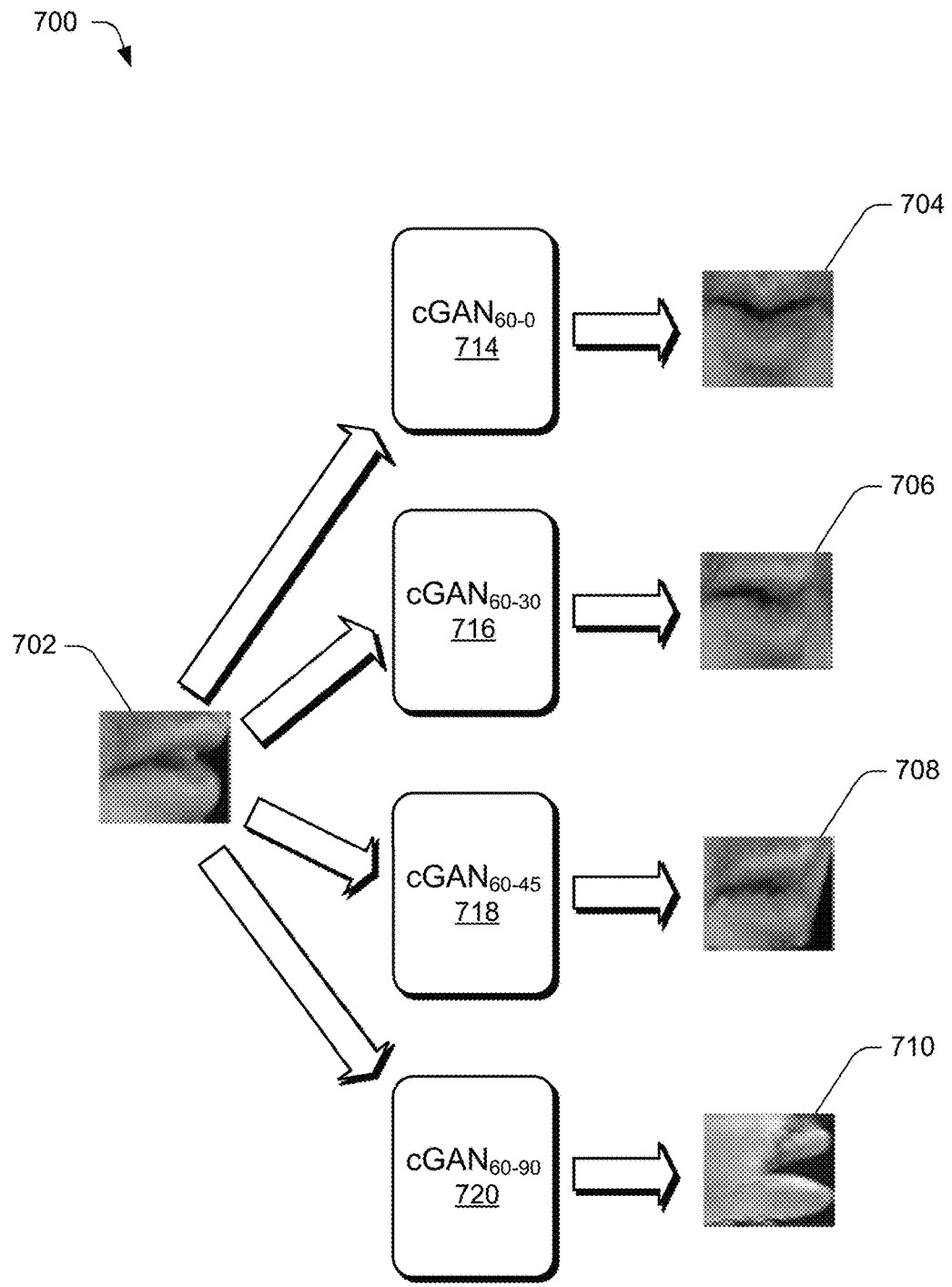

FIG. 7 illustrates an example 700 of using a single view input 702 to generate multiple additional views 704, 706, 708, and 710. In example 700, the current view angle for the speaker in the single view input 106 is 60 degrees. The visual speech recognition model selection module 124 provides view identifiers 206 indicating to the view generation system 126 to generate views for 0 degrees, 30 degrees, 45 degrees, and 90 degrees. The visual speech recognition model selection module 124 includes a $cGAN_{60-0}$ 714, a $cGAN_{60-30}$ 716, a $cGAN_{60-45}$ 718, and a $cGAN_{60-90}$ 720. The $cGAN_{60-0}$ 714 is trained to generate 0 degree views from 60 degree views, and generates additional view 704 for the 0 degree view angle. The $cGAN_{60-30}$ 716 is trained to generate 30 degree views from 60 degree views, and generates additional view 706 for the 30 degree view angle. The $cGAN_{60-45}$ 718 is trained to generate 45 degree views from 60 degree views, and generates additional view 708 for the 45 degree view angle. The $cGAN_{60-90}$ 720 is trained to generate 90 degree views from 60 degree views, and generates additional view 710 for the 90 degree view angle.

Figure 8:
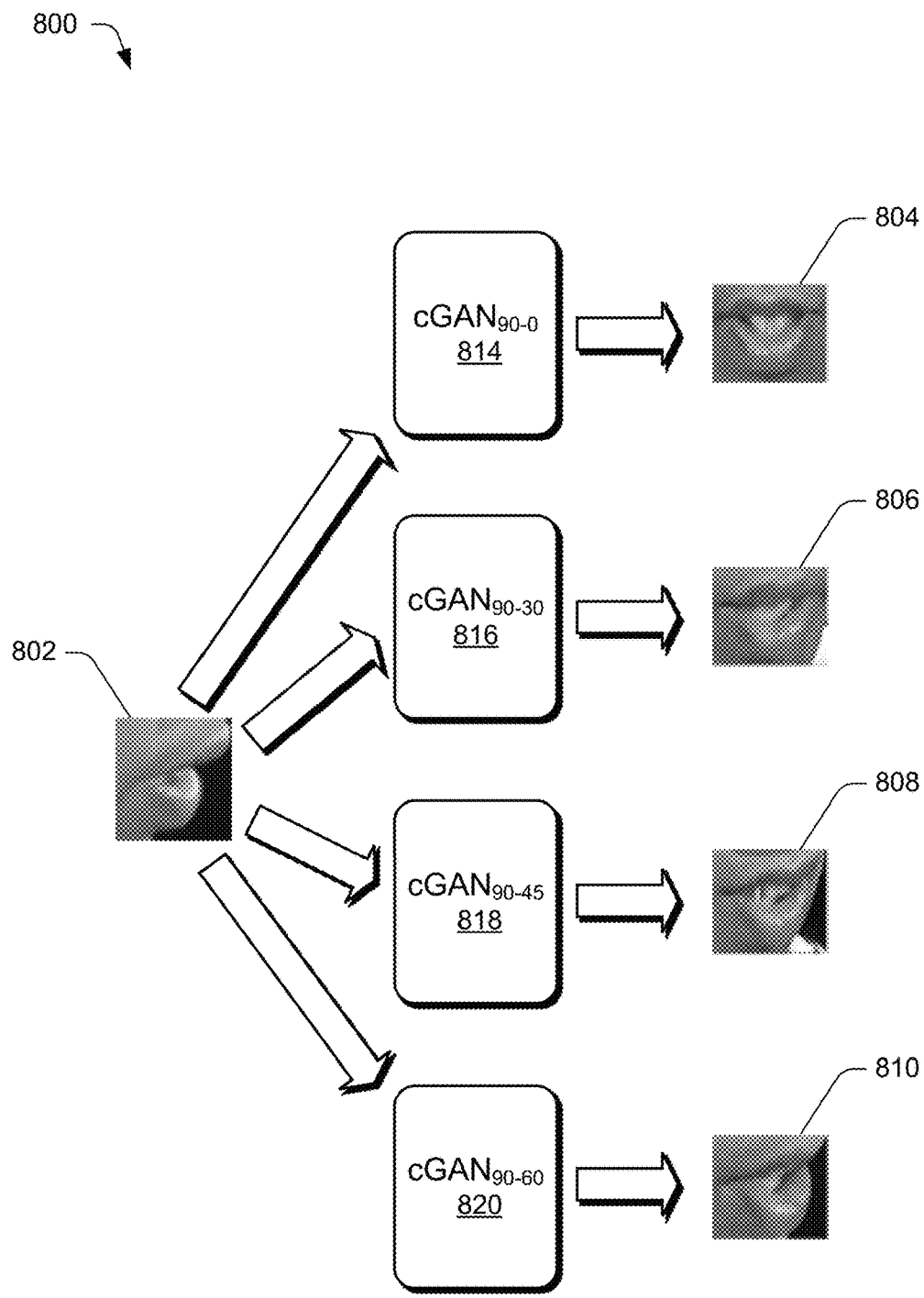

FIG. 8 illustrates an example 800 of using a single view input 802 to generate multiple additional views 804, 806, 808, and 810. In example 800, the current view angle for the speaker in the single view input 106 is 90 degrees. The visual speech recognition model selection module 124 provides view identifiers 206 indicating to the view generation system 126 to generate views for 0 degrees, 30 degrees, 45 degrees, and 60 degrees. The visual speech recognition model selection module 124 includes a $cGAN_{90-0}$ 814, a $cGAN_{90-30}$ 816, a $cGAN_{90-45}$ 818, and a $cGAN_{90-60}$ 820. The $cGAN_{90-0}$ 814 is trained to generate 0 degree views from 90 degree views, and generates additional view 804 for the 0 degree view angle. The $cGAN_{90-30}$ 816 is trained to generate 30 degree views from 90 degree views, and generates additional view 806 for the 30 degree view angle. The $cGAN_{90-45}$ 818 is trained to generate 45 degree views from 90 degree views, and generates additional view 808 for the 45 degree view angle. The $cGAN_{90-60}$ 820 is trained to generate 60 degree views from 90 degree views, and generates additional view 810 for the 60 degree view angle.

Returning to FIG. 2, each cGAN is trained, for example, by updating weights of filters in the generator model to minimize a loss between a known view and the view generated by the generator model for the training images. Weights of filters in the discriminator model are updated to maximize a loss between a known view and the view generated by the generator model for the training images. By way of example, for training each cGAN a set of training images that include at least lip regions of speakers (and optionally include additional portions of speakers' faces) of size 256×256 pixels is used. While training, a batch size of 8 is used to train the cGAN, and instance normalization is optionally performed over the training images.

Although the view generation system 126 is discussed as using cGANs, additionally or alternatively various other generative machine learning systems can be used. For example, the view generation system 126 can be implemented using one or more unconditional GANs, one or more Disentangled Representation learning-Generative Adversarial Network (DR-GANs), one or more variational autoencoders (VAEs), and so forth.

The selected visual speech recognition model 204 receives the single view input 106 as well as the generated views 210, and proceeds to perform visual speech recognition to generate the text label 208. The selected visual speech recognition model 204 can be implemented using any of a variety of different public and/or proprietary techniques. In one or more implementations, the selected visual speech recognition model 204 includes one or more machine learning systems, which can be implemented using various different machine learning techniques as discussed above. It should be noted that the selected visual speech recognition model 204 may perform visual speech recognition of the single view input 106 based on multiple frames of the single view input 106 (e.g., a video sequence of multiple frames), and that a set of generated views 210 is generated by the visual speech recognition model selection module 124 for each frame of the single view input 106.

By way of example, the selected visual speech recognition model 204 can be a classification machine learning system, such as a Bidirectional Long Short-Term Memory (BLSTM) network, that classifies the single view input 106 as one of multiple classes. Each class is, for example, a word or a sequence of multiple words.

Figure 9:
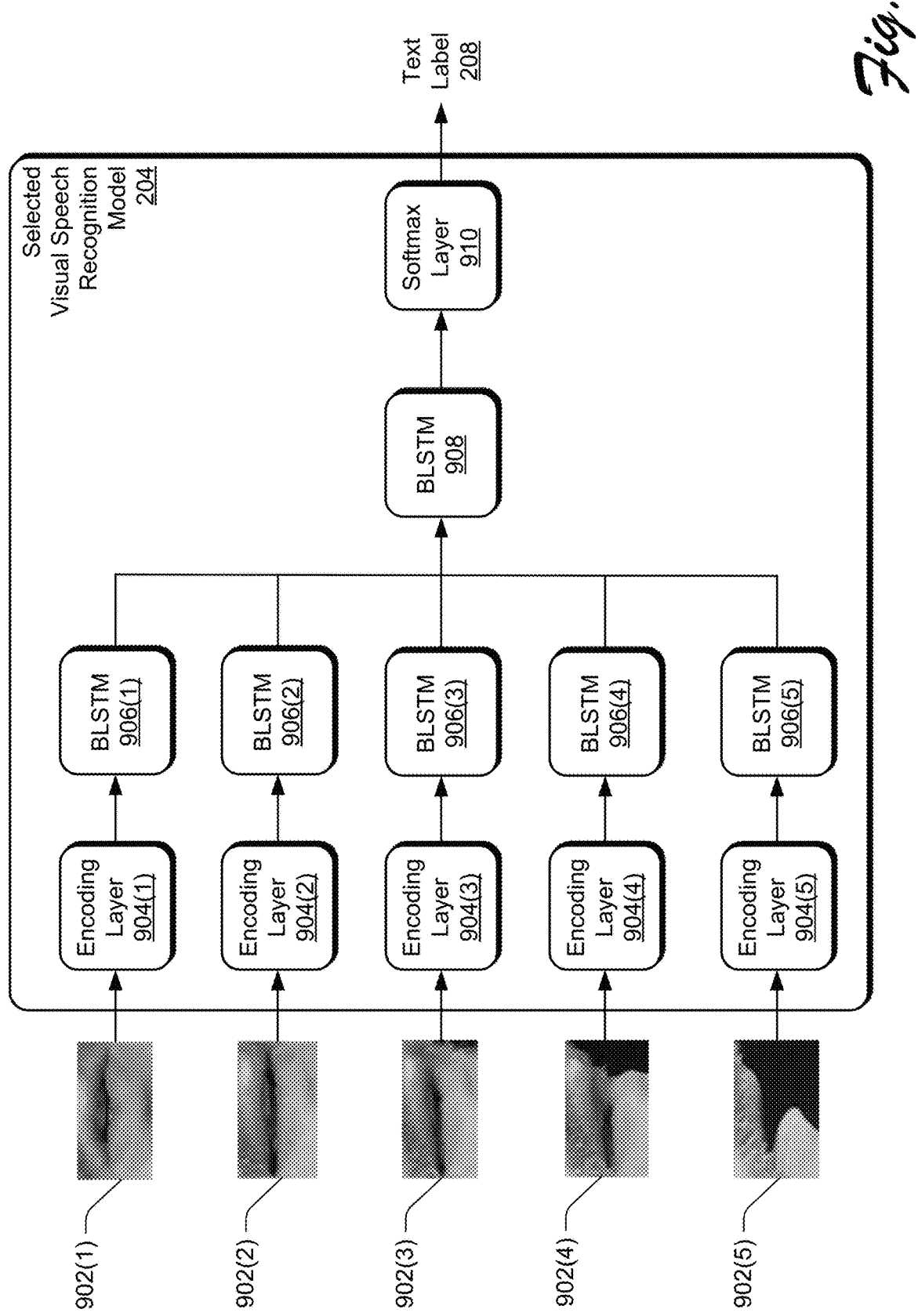
FIG. 9 is an illustration of an example selected visual speech recognition model.

FIG. 9 is an illustration of an example selected visual speech recognition model 204. The selected visual speech recognition model 204 receives five inputs 902(1), . . . , 902(5). These five inputs 902(1), . . . , 902(5) include the single view input 106 and the generated views 210 of FIG. 2. Each of the five inputs 902(1), . . . , 902(5) is input to a corresponding encoding layer 904(1), . . . , 904(5). Each encoding layer 904(1), . . . , 904(5) compresses the corresponding input view 902(1), . . . , 902(5) to a low dimensional representation. Each encoding layer 904(1), . . . , 904(5) is followed by a corresponding BLSTM 906(1), . . . , 906(5), which models the temporal dynamics of the corresponding BLSTM. The outputs of the BLSTMs 906(1), . . . , 906(5) are input to a BLSTM 908 that fuses the data from BLSTMs 906(1), . . . , 906(5) and models the temporal dynamics associated with all the views 902(1), . . . , 902(5). The result of the BLSTM 908 is provided to the softmax layer 910, which outputs a label for the input views 902(1), . . . , 902(5).

In one or more implementations, each BLSTM 906(1), . . . , 906(5), as well as the BLSTM 908, includes 450 Long Short-Term Memory (LSTM) units, each LSTM unit being formed of cells, input gates, output gates, and forget gates. Additionally or alternatively, different BLSTMs 906(1), . . . , 906(5) and/or the BLSTM 908 can include different numbers of LSTM units.

Figure 10:
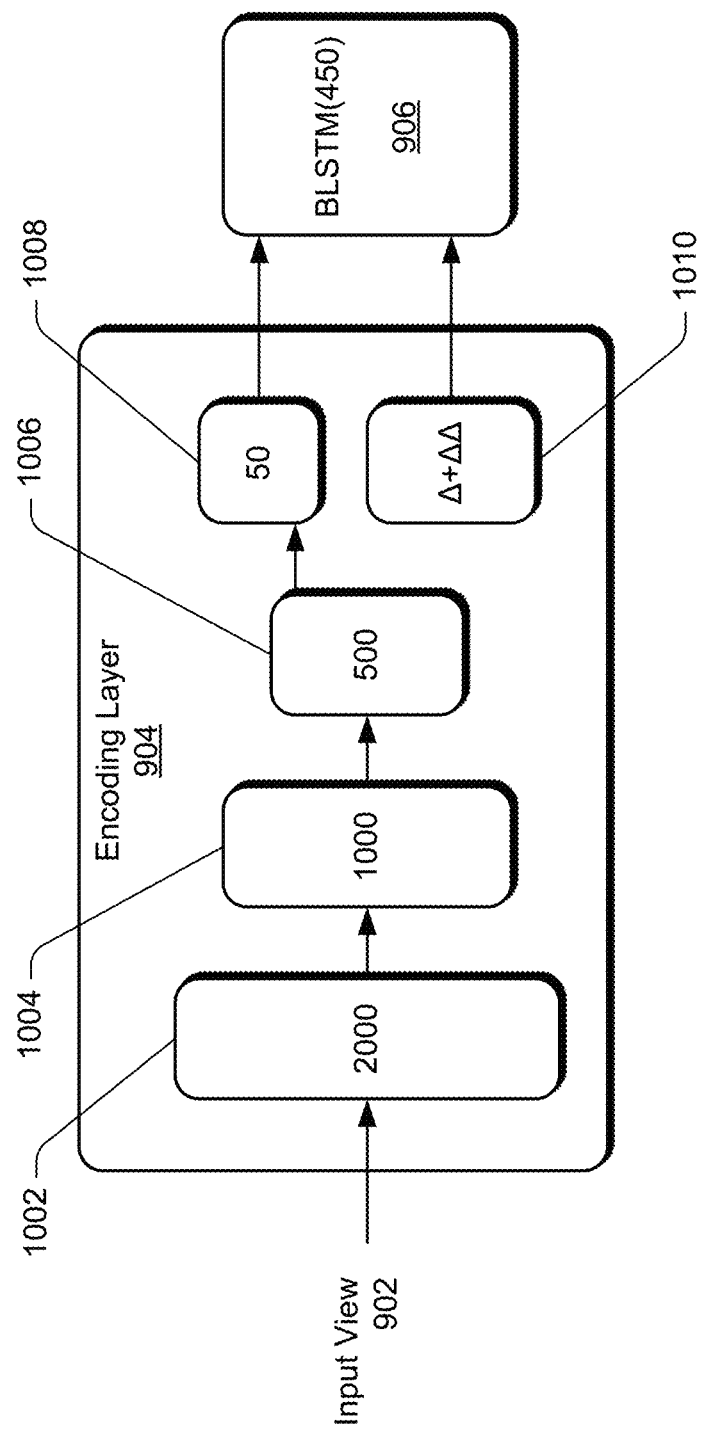
FIG. 10 is an illustration of an example encoding layer of a visual speech recognition model.

FIG. 10 is an illustration of an example encoding layer 904. The encoding layer 904 can be any one of the encoding layers 904(1), . . . , 904(5) of FIG. 9. In one or more embodiments, each of the encoding layers 904(1), . . . , 904(5) of FIG. 9 is implemented as an encoding layer 904 of FIG. 10. It should be noted that the example encoding layer 904 is only an example, and that the encoding layers 904 of FIG. 9 can additionally or alternatively be implemented with different numbers of stages, with stages generating different vector sizes than those illustrated in FIG. 10, and so forth.

The encoding layer 904 includes four different stages. In the first stage a vector 1002 including 2000 values (numbers) is generated from the input view 902. The input view 902 is one of the input views 902(1), . . . , 902(5) of FIG. 9. In a second stage a vector 1004 including 1000 numbers is generated from the vector 1002. In a third stage a vector 1006 including 500 numbers is generated from the vector 1004. In a fourth stage a vector 1008 including 50 numbers is generated from the vector 1006. The vector 1008 is input to the BLSTM 906 along with temporal natured data 1010, which are the first derivatives (A) and the second derivatives (AA). The BLSTM 906 includes 450 LSTM units, each LSTM unit being formed of cells, input gates, output gates, and forget gates.

Returning to FIG. 9, the selected visual speech recognition model 204 is trained end-to-end, allowing for the joint learning of features in the input views 902(1), . . . , 902(5) and the BLSTMs 906(1), . . . , 906(5) and the BLSTM 908. The encoding layers 904(1), . . . , 904(5) learn to extract features from the corresponding input views 902(1), . . . , 902(5) that are useful for classification using the BLSTMs 906(1), . . . , 906(5) and the BLSTM 908.

The selected visual speech recognition model 204 is trained to generate the text label 208 from the input views 902(1), . . . , 902(5). The selected visual speech recognition model 204 is trained on a set of training input views that include at least the lip regions of speakers. The set of training input views optionally include additional portions of the speakers faces, such as the complete faces of the speakers, the noses and eyes of the speakers, and so forth. Each encoding layer 904(1), . . . , 904(5) is first trained independently using a set of training input images of the corresponding view 902(1), . . . , 902(5). Once each encoding layer 904(1), . . . , 904(5) has been trained, the corresponding BLSTM 906(1), . . . , 906(5) is trained independently using a set of training input images of the corresponding view 902(1), . . . , 902(5) and the encoding generated by the corresponding encoding layer 904(1), . . . , 904(5). Once each encoding layer 904(1), . . . , 904(5) has been trained and each BLSTM 906(1), . . . , 906(5) has been trained, the BLSTM 908 and softmax layer 910 are trained using a set of training input images of the corresponding view 902(1), . . . , 902(5) and the values generated by the BLSTMs 906(1), . . . , 906(5).

Returning to FIG. 2, the selected visual speech recognition model 204 generates the text label 208 based on the single view input 106 and the generated views 210. The text label 208 can then be presented by the visual speech recognition presentation system 130 in any of a variety of different manners, such as displaying the text label 208, playing back the text label 208 audibly via one or more speakers of the computing device 102, storing the text label 208 for later display, audible playback, or analysis, and so forth.

It should be noted that although the single view input 106 includes a single view of the speaker, it should be noted that the speaker's pose can change over time. Accordingly, the current view angle of the speaker in the single view input 106 can change over time. For example, the speaker may rotate his or her head and have the current view angle change from 0 degrees to 45 degrees. The view classifier module 122 maintains a record of the current view angle of the speaker and analyzes the single view input 106 to determine whether the current view angle of the speaker has changed.

This analysis can be performed at various regular or irregular intervals, such as every threshold number of frames in the single view input 106 (e.g., every 10 frames).

In situations in which the current view angle of the speaker has not changed, the view generation system 126 continues to generate one or more additional views 210 as indicated by the view identifiers 206, and the selected visual speech recognition model 204 remains the same. However, in situations in which the view classifier module 122 determines that the current view angle of the speaker has changed, the view classifier module 122 identifies the current view angle of the speaker to the visual speech recognition model selection module 124 as the view label 202. The visual speech recognition model selection module 124 selects a visual speech recognition model 204 (which may or may not be the same as the previously selected visual speech recognition model 204), and provides an indication of the one or more additional views to be generated to the view generation system 126 as view identifiers 206. The view generation system 126 proceeds to generate the one or more additional views as indicated by the visual speech recognition model selection module 124, and provides the one or more additional views to the selected visual speech recognition model 204 as the generated views 210.

Figure 11:
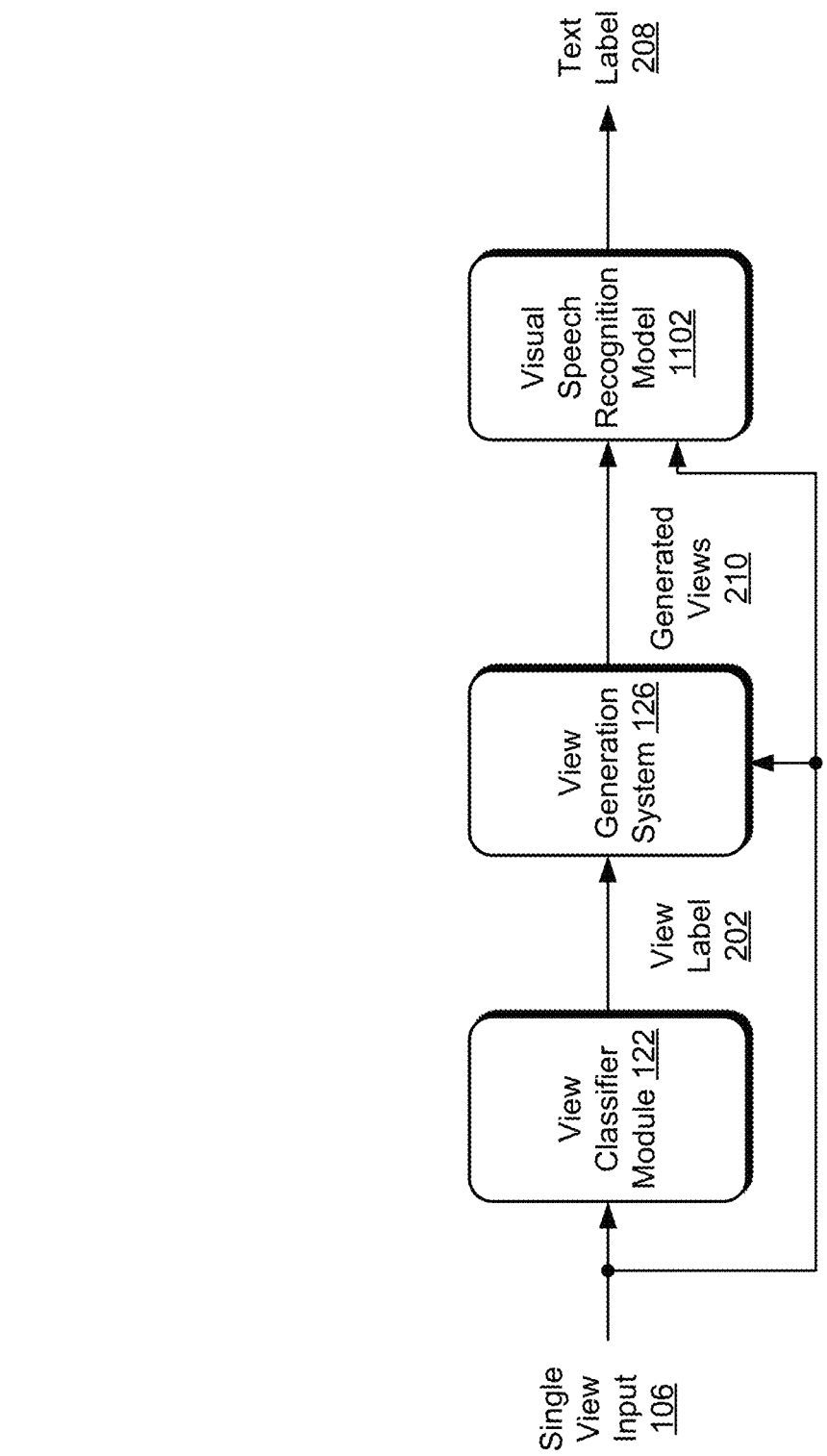
FIG. 11 is an illustration of another example architecture of a pose-invariant visual speech recognition system.

FIG. 11 is an illustration of another example architecture of a pose-invariant visual speech recognition system 104. The example architecture of FIG. 11 is similar to the example architecture of FIG. 2, except that a visual speech recognition model selection module and a visual speech recognition model library are not included in the example architecture of FIG. 11.

In the example architecture of FIG. 11 the pose-invariant visual speech recognition system 104 includes a view classifier module 122 that receives the single view input 106. The view classifier module 122 classifies the current view angle of the speaker in the single view input 106, and provides a view label 202 identifying the current view angle of the speaker to the view generation system 126. The view generation system 126 generates one or more additional views based on the single view input 106, and outputs the one or more additional views as the generated views 210. The pose-invariant visual speech recognition system 104 includes a single visual speech recognition model 1102 that generates the text label 208. The single visual speech recognition model 1102 operates analogous to the selected visual speech recognition model 204 of FIG. 2, although in the example of FIG. 11 the pose-invariant visual speech recognition system 104 includes a single visual speech recognition model 1102 rather than a visual speech recognition model library 128 from which a visual speech recognition model is selected.

In the example of FIG. 11, the view generation system 126 determines one or more additional views to generate based on the view label 202. The view generation system 126 is preconfigured with which views are used by the visual speech recognition model 1102, and generates one or more additional views that are not the current view angle. For example, assume the visual speech recognition model 1102 uses view angles of 0 degrees, 30 degrees, 45 degrees, 60 degrees, and 90 degrees, and the current view angle of the single view input 106 is one of 0 degrees, 30 degrees, 45 degrees, 60 degrees, and 90 degrees. The view generation system 126 generates the other view angles that are not the current view angle of the single view input 106 (e.g., if the current view angle is 45 degrees, then the view generation system 126 generates as the generated views 210 views having view angles of 0 degrees, 30 degrees, 60 degrees, and 90 degrees).

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-11.

Figure 12:
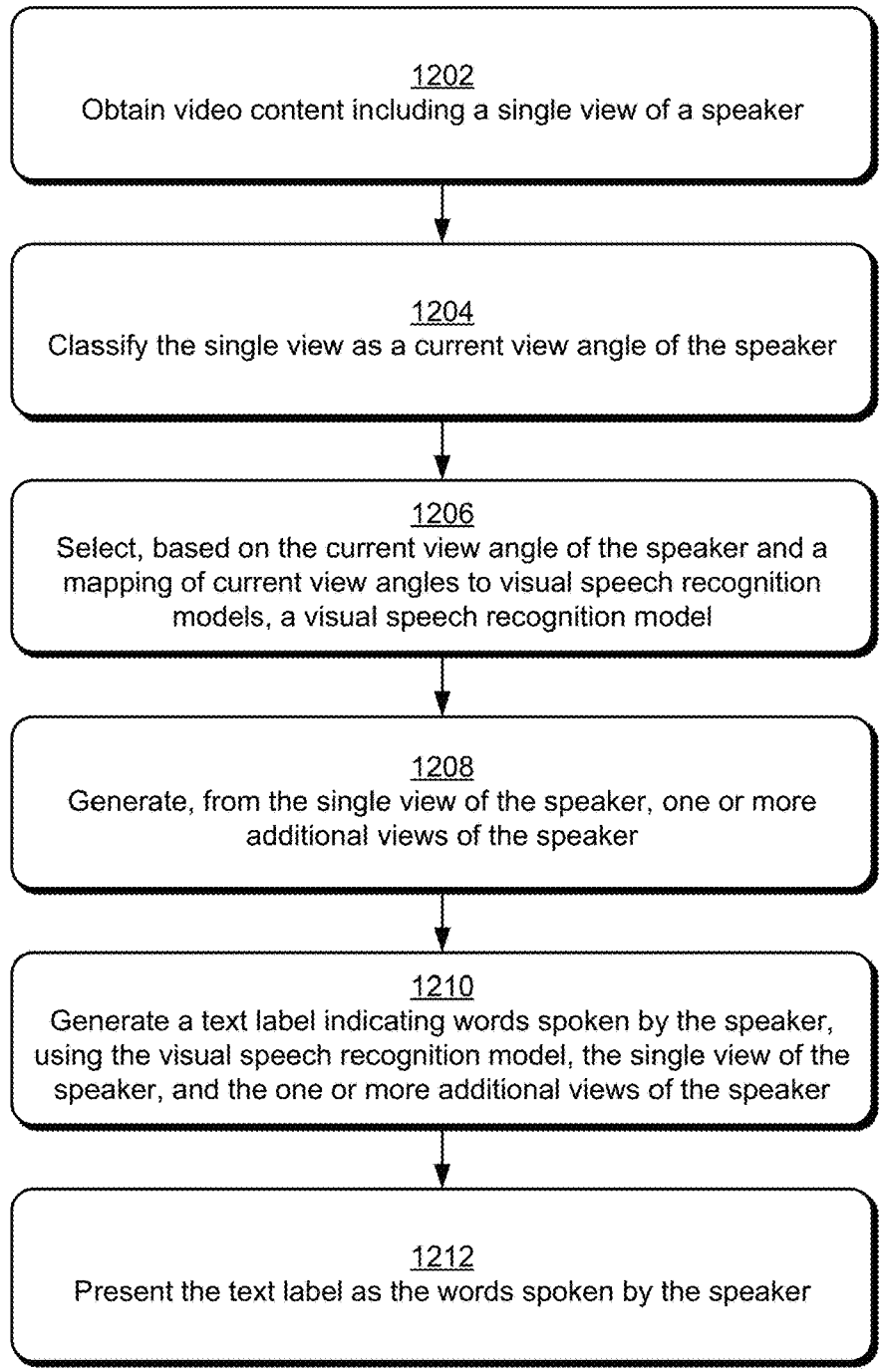
FIG. 12 is a flow diagram depicting a procedure in an example implementation of pose-invariant visual speech recognition using a single view input.

FIG. 12 is a flow diagram 1200 depicting a procedure in an example implementation of pose-invariant visual speech recognition using a single view input. In this example, video content including a single view of a speaker is obtained (block 1202). The video content can be obtained from one or more of a variety of different sources, such as from storage 108, from a camera or other image capture device of the computing device 102, from a remote storage device (e.g., accessed via the network 118), from a video content transmission service or device, and so forth.

The single view of the speaker is classified as the current view angle of the speaker (block 1204). Multiple different view angles are supported, and the pose of the speaker in the single view is classified as one of those multiple different view angles. For example, the single view of the speaker can be classified as one of five different viewing angles: 0 degrees, 30 degrees, 45 degrees, 60 degrees, and 90 degrees.

A visual speech recognition model is selected based on the current view angle of the speaker and a mapping of current view angles to visual speech recognition models (block 1206). A visual speech recognition model library including multiple different visual speech recognition models is maintained, and one of those visual speech recognition models in the visual speech recognition model library is selected based on the current view angle of the speaker. The selected visual speech recognition model is a multi-view visual speech recognition model, relying on video content including multiple different views of the speaker to generate text labels indicating words spoken by the speaker.

One or more additional views of the speaker are generated from the single view of the speaker (block 1208). These one or more additional views are generated by one or more machine learning systems based on the single view of the speaker. Each of these one or more additional views of the speaker is one of the multiple supported view angles relied on by the selected visual speech recognition models to generate text labels indicating words spoken by the speaker.

The visual speech recognition model selected in block 1206 generates a text label indicating the words spoken by the speaker (block 1210). The visual speech recognition model generates the text label based on the single view of the speaker in the obtained video content as well as on the one or more additional views of the speaker generated in block 1208. As discussed above, the visual speech recognition model relies on multiple view angles of the speaker when generating the text label.

The text label is presented as the words spoken by the speaker (block 1212). The text label can be presented in various different manners, such as played back audibly, displayed on a display device, and so forth.

Thus, although the visual speech recognition model relies on multiple view angles of the speaker, the pose-invariant visual speech recognition system visually recognizes speech despite having only a single view of the speaker in the video content.

Example System and Device

Figure 13:
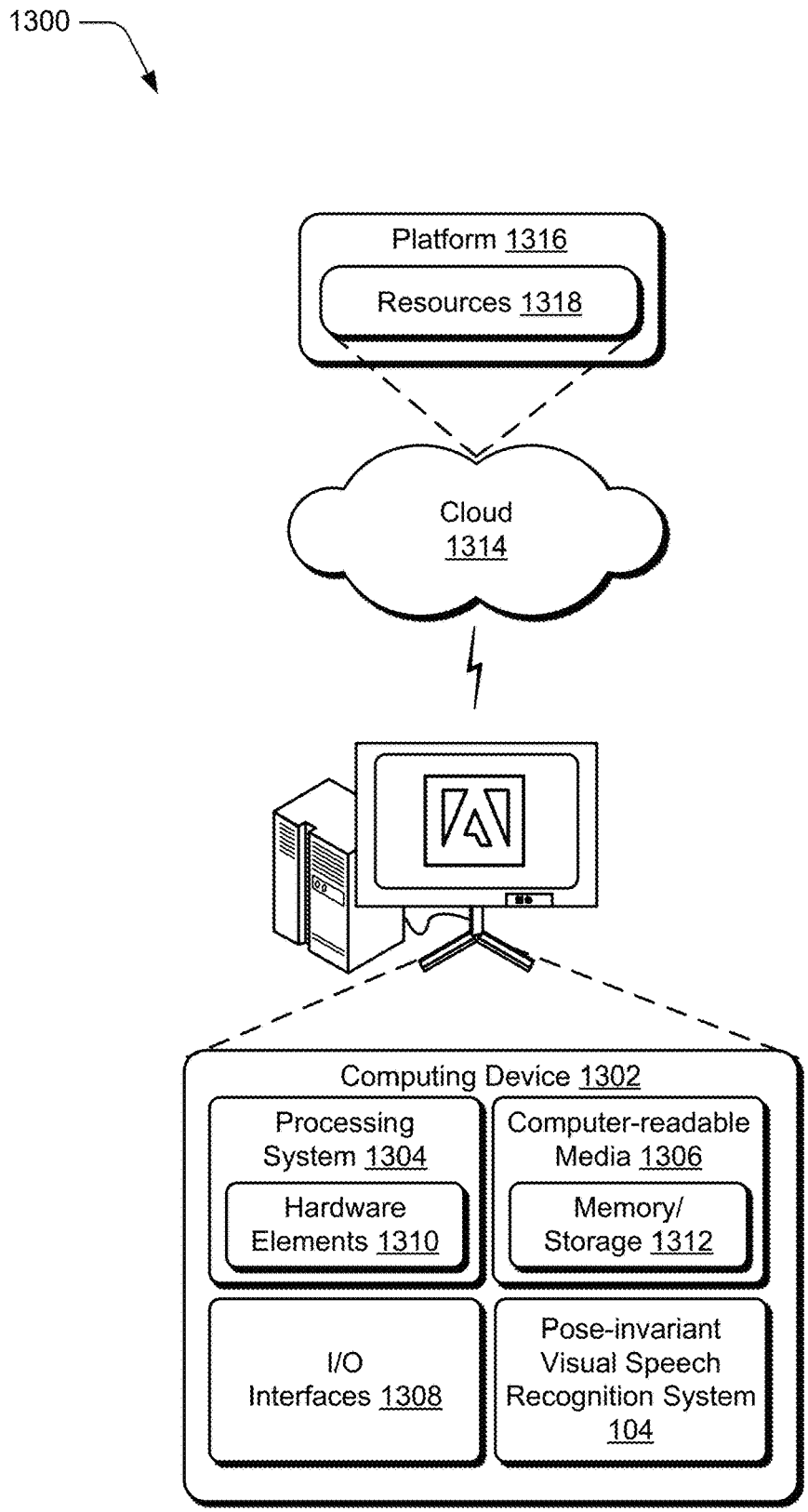
FIG. 13 illustrates an example system including various components of an example device that can be implemented as any type of computing device as described and/or utilize with reference to FIGS. 1-12 to implement aspects of the techniques described herein.

FIG. 13 illustrates an example system generally at 1300 that includes an example computing device 1302 that is representative of one or more computing systems and/or devices that may implement the various techniques described herein. This is illustrated through inclusion of the pose-invariant visual speech recognition system 104. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to visually recognize speech from a single view of a speaker in video content and using a visual speech recognition model that relies on multiple view angles of the speaker to generate text labels indicating words spoken by the speaker, a method implemented by at least one computing device, the method comprising:
    obtaining video content including a single view of the speaker having a particular pose;
    classifying the single view as a current view angle of the speaker, the current view angle being one of multiple supported view angles classified based on the particular pose;
    selecting, based on the current view angle of the speaker and a mapping of current view angles to visual speech recognition models, one of multiple visual speech recognition models;
    generating, from the single view of the speaker and using a machine learning system, one or more additional views of the speaker, each of the one or more additional views being one of the multiple supported view angles;
    generating, using the one of the multiple visual speech recognition models and based on the single view of the speaker as well as the one or more additional views of the speaker, a text label indicating words spoken by the speaker, the one of the multiple visual speech recognition models relying on multiple view angles of the speaker when generating the text label; and
    presenting the text label as the words spoken by the speaker.

2. The method as recited in claim 1, the multiple supported views including 0 degrees, 30 degrees, 45 degrees, 60 degrees, and 90 degrees.

3. The method as recited in claim 1, the generating the one or more additional views of the speaker comprising determining, using a mapping of the current view angle to a set of view identifiers, which of the multiple supported view angles to generate as the one or more additional views.

4. The method as recited in claim 1, the presenting the text label comprising displaying the words spoken by the speaker.

5. The method as recited in claim 1, the presenting the text label comprising playing back audibly the words spoken by the speaker.

6. The method as recited in claim 1, the machine learning system comprising one or more generative adversarial networks (GANs).

7. The method as recited in claim 6, the one or more GANs comprising one GAN for each different combination of supported view angle and additional view.

8. The method as recited in claim 1, the particular pose of the speaker changing during the video content.

9. The method as recited in claim 1, the obtaining video content including a single view of the speaker comprising capturing the video content from a single camera.

10. In a digital medium environment to visually recognize speech from a single view of a speaker in video content and using a visual speech recognition model that relies on multiple view angles of the speaker to generate text labels indicating words spoken by the speaker, a computing device comprising:
    a processor; and
    computer-readable storage media having stored thereon multiple instructions that, responsive to execution by the processor, cause the processor to perform operations comprising:
        obtaining video content including a single view of the speaker having a particular pose;

classifying the single view as a current view angle of the speaker, the current view angle being one of multiple supported view angles classified based on the particular pose;

selecting, based on the current view angle of the speaker and a mapping of current view angles to visual speech recognition models, one of multiple visual speech recognition models;

generating, from the single view of the speaker and using a machine learning system, one or more additional views of the speaker, each of the one or more additional views being one of the multiple supported view angles;

generating, using the one of the multiple visual speech recognition models and based on the single view of the speaker as well as the one or more additional views of the speaker, a text label indicating words spoken by the speaker, the one of the multiple visual speech recognition models relying on multiple view angles of the speaker when generating the text label; and presenting the text label as the words spoken by the speaker.

11. The computing device as recited in claim 10, the generating the one or more additional views of the speaker comprising determining, using a mapping of the current view angle to a set of view, which of the multiple supported view angles to generate as the one or more additional views.

12. The computing device as recited in claim 10, the machine learning system comprising one or more generative adversarial networks (GANs).

13. The computing device as recited in claim 12, the one or more GANs comprising one GAN for each different combination of supported view angle and additional view.

14. The computing device as recited in claim 10, the particular pose of the speaker changing during the video content.

15. The computing device as recited in claim 10, the computing device further comprising one or more cameras, and the obtaining video content including a single view of the speaker comprising capturing the video content from a single camera of the one or more cameras.

16. A system implemented by at least one computing device to visually recognize speech from a single view of a speaker in video content and using a visual speech recognition model that relies on multiple view angles of the speaker to generate text labels indicating words spoken by the speaker, the system comprising:

a view classifier module to obtain video content including a single view of the speaker having a particular pose and to classify the single view of the speaker as a current view angle of the speaker, the current view angle being one of multiple supported view angles classified based on the particular pose;

a visual speech recognition model selection module to select, based on the current view angle of the speaker and a mapping of current view angles to visual speech recognition models, one of the multiple visual speech recognition models;

a view generation system to generate, from the single view of the speaker and using a machine learning system, one or more additional views of the speaker, each of the one or more additional views being one of the multiple supported view angles;

the one of the multiple visual speech recognition models being to generate, based on the single view of the speaker as well as the one or more additional views of the speaker, a text label indicating words spoken by the speaker, the one of the multiple visual speech recognition models relying on multiple view angles of the speaker when generating the text label; and a visual speech recognition presentation system to present the text label as the words spoken by the speaker.

17. The system as recited in claim 16, the machine learning system comprising one or more generative adversarial networks (GANs).

18. The system as recited in claim 17, the one or more GANs comprising one GAN for each different combination of supported view angle and additional view.

19. The system as recited in claim 16, the particular pose of the speaker changing during the video content.

20. The system as recited in claim 16, the system further comprising one or more cameras, and the video content being captured by a single camera of the one or more cameras.

* * * * *